United States Patent
Wang

(10) Patent No.: US 10,241,326 B2
(45) Date of Patent: Mar. 26, 2019

(54) CORRECTING UNDESIRED DISTORTIONS OR ABERRATIONS AND GENERATING DESIRED WAVEFRONTS IN OPTICAL IMAGING, SENSING, SIGNALING AND OTHER APPLICATIONS BASED ON BI-VALUED WALSH FUNCTIONS

(71) Applicant: C URCHIN TECHNOLOGIES LLC, Concord, MA (US)

(72) Inventor: Feiling Wang, Medford, MA (US)

(73) Assignee: C URCHIN TECHNOLOGIES LLC, Concord, MA (US)

( * ) Notice: Subject to any disclaimer, the term of this patent is extended or adjusted under 35 U.S.C. 154(b) by 535 days.

(21) Appl. No.: 14/422,163

(22) PCT Filed: Aug. 21, 2013

(86) PCT No.: PCT/US2013/056067
§ 371 (c)(1),
(2) Date: Feb. 17, 2015

(87) PCT Pub. No.: WO2014/031797
PCT Pub. Date: Feb. 27, 2014

(65) Prior Publication Data
US 2015/0234182 A1   Aug. 20, 2015

Related U.S. Application Data

(60) Provisional application No. 61/691,389, filed on Aug. 21, 2012.

(51) Int. Cl.
*G02B 26/00* (2006.01)
*G02F 1/01* (2006.01)
(Continued)

(52) U.S. Cl.
CPC ......... *G02B 27/0068* (2013.01); *G02B 26/06* (2013.01)

(58) Field of Classification Search
CPC .. G02B 27/0068; G02B 26/06; G02B 26/001; G02B 6/2766; G02B 27/283; G02F 1/31;
(Continued)

(56) References Cited

U.S. PATENT DOCUMENTS 3,967,899 A   7/1976   O'Meara
8,199,387 B1   6/2012   Aye et al.
(Continued)

FOREIGN PATENT DOCUMENTS

CN   102288305 A   12/2011

OTHER PUBLICATIONS

Wang, F., "High-Contrast Imaging Via Modal Convergence of Deformable Mirror", The Astrophysical Journal, 751 (2):1-17, Jun. 2012.
(Continued)

*Primary Examiner* — Dawayne Pinkney
(74) *Attorney, Agent, or Firm* — Perkins Coie LLP

(57) ABSTRACT

Devices, systems and techniques are provided for adaptive transformation of wavefronts of optical waves or other electromagnetic waves to either correct the undesirable aberration or provide desirable wavefronts or aberrations for various applications, including imaging, sensing, signaling and other applications.

27 Claims, 14 Drawing Sheets

(51) Int. Cl.
*A61B 3/00* (2006.01)
*A61B 3/10* (2006.01)
*G02B 27/00* (2006.01)
*G02B 26/06* (2006.01)

(58) Field of Classification Search
CPC ........ G02F 1/093; G02F 1/0123; G02F 1/293; G02F 1/3538; H04B 10/505; H04B 2203/50; B82Y 20/00; A61B 3/103; A61B 3/14; A61B 3/1225; A61B 3/1015; A61B 3/113; A61H 5/00
USPC ........ 359/239, 238, 278–279, 245, 299–304; 351/200, 205–206, 203, 215, 221, 246, 351/210–211
See application file for complete search history.

(56) References Cited

U.S. PATENT DOCUMENTS

| | | | |
|---|---|---|---|
| 2003/0179433 A1* | 9/2003 | Hunt | B82Y 20/00 359/279 |
| 2005/0254112 A1* | 11/2005 | Webb | G02B 26/06 359/224.1 |
| 2005/0254709 A1 | 11/2005 | Geshwind et al. | |
| 2006/0049331 A1 | 3/2006 | Smith | |
| 2006/0186312 A1 | 8/2006 | Altman et al. | |
| 2007/0194239 A1* | 8/2007 | McAllister | G01J 3/02 250/339.07 |
| 2010/0053411 A1 | 3/2010 | Robinson et al. | |

OTHER PUBLICATIONS

European Extended Search Report dated Feb. 29, 2016 for European Patent Application No. 13830694.9, filed on Aug. 21, 2013 (9 pages).
Examination Report dated Oct. 28, 2016 for European Application No. 13830694.9, filed on Aug. 21, 2013 (5 pages).
Kang, S., Authorized Officer, Korean Intellectual Property Office, International Search Report, PCT Application No. PCT/US2013/056067, dated Nov. 27, 2013, 19 pages.
Gendron et al., "Astronomical adaptive optics, I. Modal control optimization", Astron. Astrophys. 291 (1994) pp. 337-347.
Girardet, et al., "Off-Line and on-line modal optimization of the MMT-AO system", Proc. of SPIE, vol. 5903, 2005, pp. 109-119.
Nicholls, et al., "Use of a Shack-Hartmann wave-front sensor to measure deviations from a Kolmogorov phase spectrum", Opt. Lett. 20, 1995, pp. 2460-2462.
Rao, et al., "Measuring the power-law exponent of an atmospheric turbulence phase power spectrum with a Shack Hartmann wavefront sensor", Opt. Lett. 24, 1999, 1008-1010.
Poyneer, et al., "Experimental validation of Fourier-transform wavefront reconstruction at the Palomar Observatory", Opt. Lett. 28, 2003, pp. 798-800.
Booth, "Direct measurement of Zernike aberration modes with a modal wavefront sensor", Proc. of SPIE, vol. 5162, 2003, pp. 79-90.
Yang, "Wavefront sensing through measurements of binary aberration modes", Appl. Opt. 48, 2009, pp. 2865-2870.

* cited by examiner

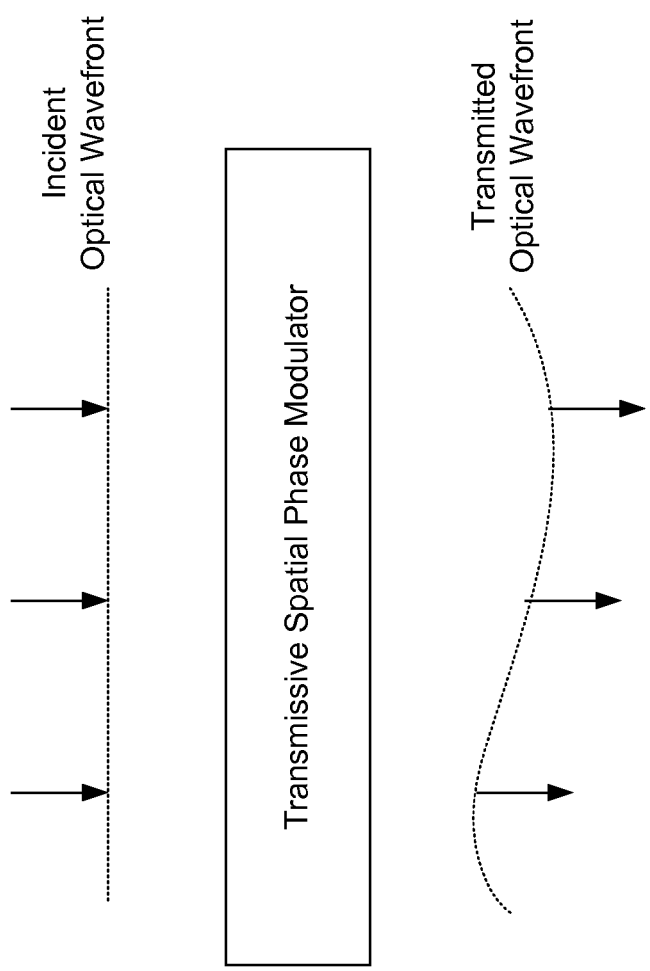

The 2D Walsh functions as the binary aberration modes, $W_{m,n}$. These functions can have only two values, 1 and 1, indicated by the bright and dark fields 4 Deformable Pixels under Control of $2^2$ Wash codes 6 Deformable Pixels under Control of 6 of $2^3$ Wash codes (2 unused Wash codes)

9 Deformable Pixels under Control of 9 of $2^4$ Wash codes (4 unused Wash codes)

CORRECTING UNDESIRED DISTORTIONS OR ABERRATIONS AND GENERATING DESIRED WAVEFRONTS IN OPTICAL IMAGING, SENSING, SIGNALING AND OTHER APPLICATIONS BASED ON BI-VALUED WALSH FUNCTIONS

CROSS REFERENCE TO RELATED APPLICATION

This patent document is a 35 U.S.C. § 371 National Stage application of PCT Application No. PCT/US2013/056067, filed on Aug. 21, 2013, which further claims the benefits and priority of U.S. Provisional Patent Application No. 61/691,389, entitled "Transforming and correcting optical wavefronts for imaging and other purposes" and filed on Aug. 21, 2012. The entire content of the aforementioned patent applications is incorporated by reference as part of the disclosure of this patent document.

TECHNICAL FIELD

This patent document relates to techniques, devices and systems for using electromagnetic waves including optical waves in imaging, sensing or signaling and other applications.

BACKGROUND

Electromagnetic waves including optical waves can be subject to distortions, aberrations or other perturbations in imaging, sensing or signaling and other applications. Random and uncontrolled aberrations of optical wavefronts are often undesirable as they degrade the performance of imaging and other optical systems while deliberate and controlled aberrations can be useful in achieving such goals as beam reshaping and combining.

SUMMARY

Devices, systems and techniques in this patent document are related to adaptive transformation of wavefronts of optical waves or other electromagnetic waves to either correct the undesirable aberration or provide desirable wavefronts or aberrations for various applications, including imaging, sensing, signaling and other applications.

In one implementation, an electromagnetic-field transform system is provided to imply a wavefront modifier having a plural of control variables whose values are optimized from time to time, for achieving and maintaining an intended transform, through adjustments of Walsh-function amplitudes associated with said values.

BRIEF DESCRIPTION OF THE DRAWINGS

FIGS. 2A, 2B and 2C show examples of an optical wavefront modifier having actuator elements.

DETAILED DESCRIPTION

Aberrations of optical wavefronts prevent imaging systems from focusing light waves into tight spots, resulting in blurry images. Imaging systems suffer from this effect include microscopes, cameras and telescopes. In non-imaging optical systems, such as free-space laser communication systems, directed energy systems and other beam-forming systems, random and uncontrolled wavefront aberrations also adversely affect the performance of these systems. In other optical systems, aberrations can be deliberately introduced to optical wavefronts for achieving certain objectives such as coherent beam combining and optical trapping.

There are existing methods, or prior art, for controlling optical wavefronts. In an existing technique for correcting aberrated wavefronts for imaging, a dedicated wavefront sensing device, or a wavefront sensor, is employed to characterize the aberration; a wavefront modifier, commonly a deformable mirror, is subsequently employed to correct the aberration. Drawbacks of this technique include limited speeds, poor performance under low-light conditions, limited correction resolution, inability in providing high-contrast imaging and inapplicability to certain microscopic imaging modalities. There is another category of existing techniques for correcting aberrated wavefronts that does away with a wavefront sensor by optimizing a deformable mirror under the guidance of a performance metric derived from the system state. These existing techniques typically suffer from one or more of these drawbacks: slow speeds, stagnation of the optimization processes, low sensitivity to perturbations of the wavefront modifier and poor wavefront correction resolution. There are existing techniques for wavefront shaping in non-imaging optical systems; these techniques typically involve heavy computation and are slow and suboptimal in the transformations they provide.

Walsh functions can be used for the control of deformable mirror with light-intensity measurements through single-mode fiber where the wavefront modifiers exert phase adjustments to the optical wavefront in Walsh functions patterns. This requirement can significantly limit the applicability of the method to deformable mirrors that possess segmented surfaces and that provide only piston motions. Also, the number of controlled segments of the deformable mirror is set to be equal to two (2) to the power of an integer and this requirement also restricts the applicability of the control method.

The disclosed technology in this document can be implemented for transforming optical wavefronts to serve many imaging or non-imaging purposes with the characteristics of high speed, high reliability and optimal transforms.

Figure 1:
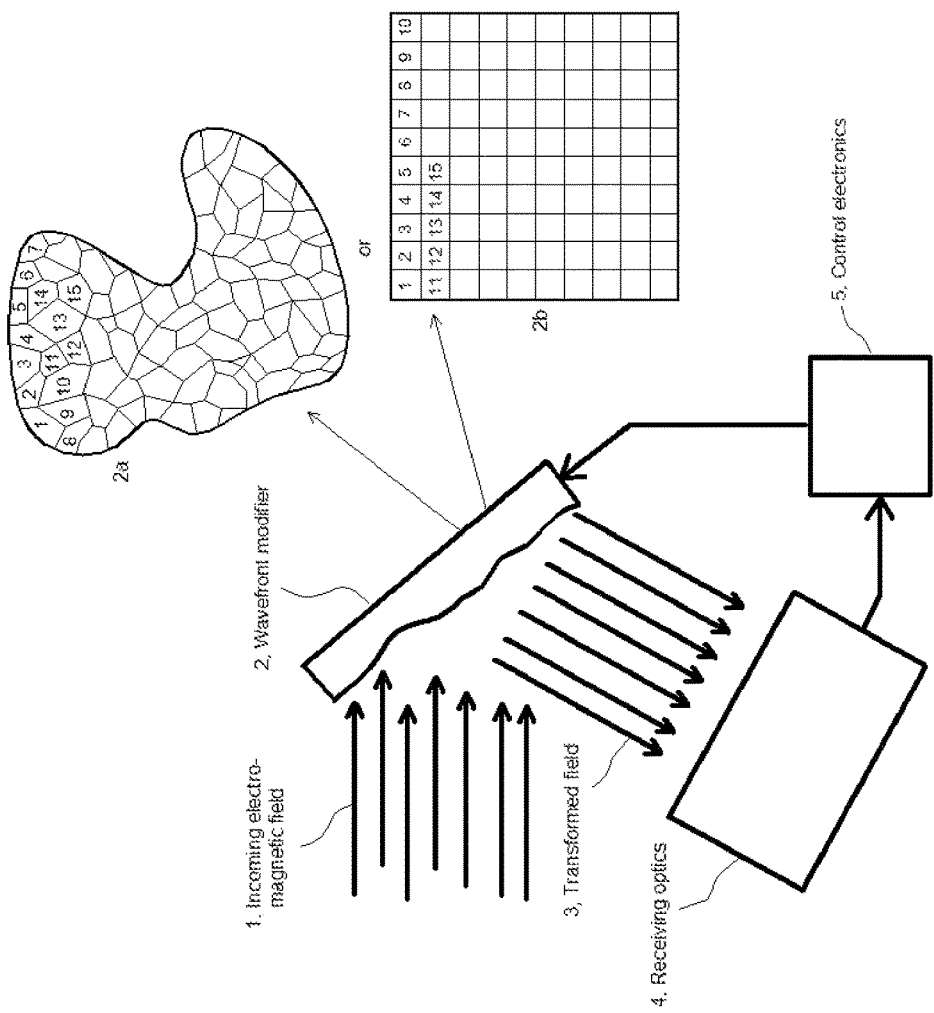
FIG. 1 shows an example of an optical system with an adaptive control based on bi-valued codes and optical sensing.

FIG. 1 shows one example of an optical system having an adaptive control. This system includes an optical wavefront modifier (2) configured to modify at least a spatial phase pattern of an optical wavefront of an optical input signal (1) to produce a modified optical signal (3) having a modified optical wavefront. The optical wavefront modifier includes an array of actuator elements at different locations each operable to modify at least a local phase of the optical wavefront of the modified optical signal, The actuator elements are coupled to receive actuator element control signals, respectively, to effectuate respective local phase values at different locations of the modified optical wavefront. This system includes an optical sensor unit or receiving optics (4) located in an optical path of the modified optical signal from the adaptive optical wavefront modifier and configured to convert the modified optical signal into an optical sensor signal containing information at different locations on the modified optical wavefront. A control electronic unit (5) is coupled to the optical sensor unit (4) to receive the optical sensor signal and coupled to the optical wavefront modifier (2) to generate the actuator element control signals based on the optical sensor signal, the control electronic unit configured to generate different sets of the actuator element control signals based on different sets of bi-valued codes, respectively, to generate different sets of local phase values at the optical wavefront modifier that are adaptive to information in the optical sensor signal received at the optical sensor unit over time.

The disclosed wavefront transformation is applicable to a variety of optical systems, imaging or non-imaging. In operation of the optical system in FIG. 1, the original wavefront is transformed by the wavefront modifier to become the transformed wavefront; the active surface of the wavefront modifier can have a geometrically simple boundary such as a square or irregular shapes such as the two example patterns in FIG. 1. The surface of the wavefront modifier is composed of segments, each of which can be moved to perturb the optical wavefront. It is should be understood that "segments" include areas that can be moved relative to their surrounding areas in a physically continuous surface.

Figure 2A:
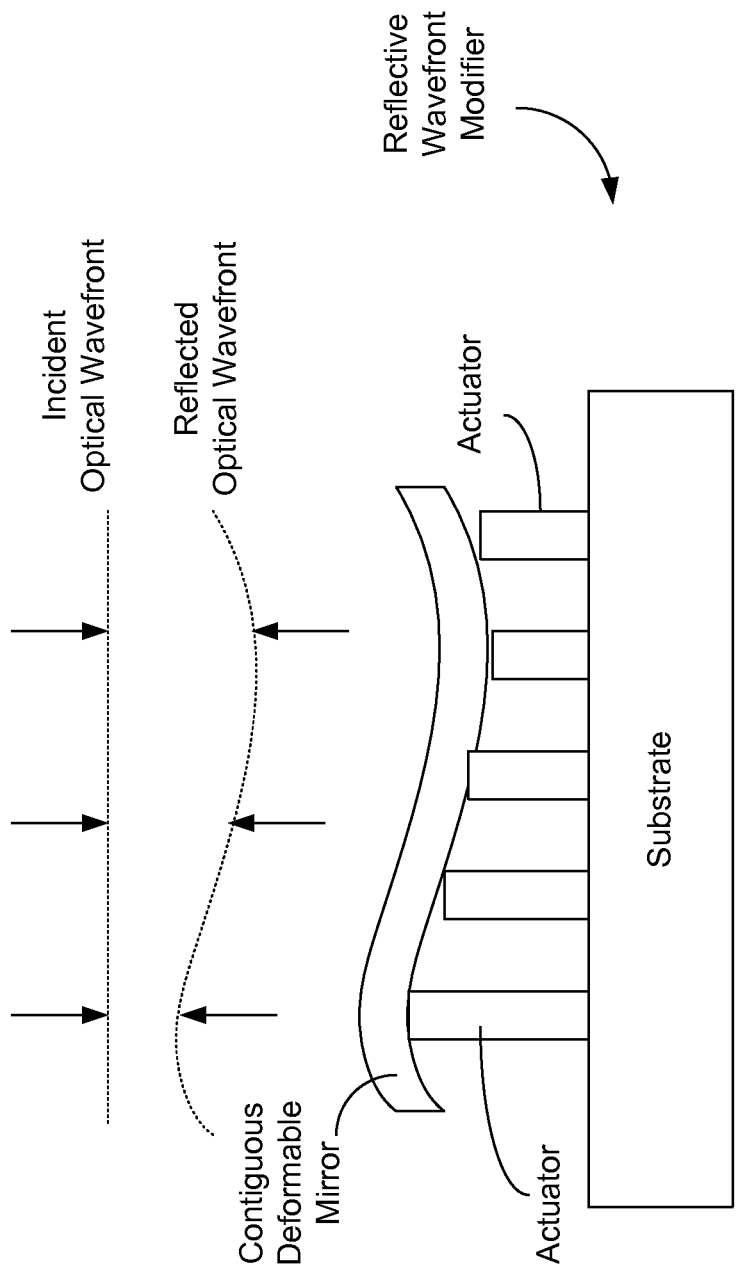
Figure 2B:
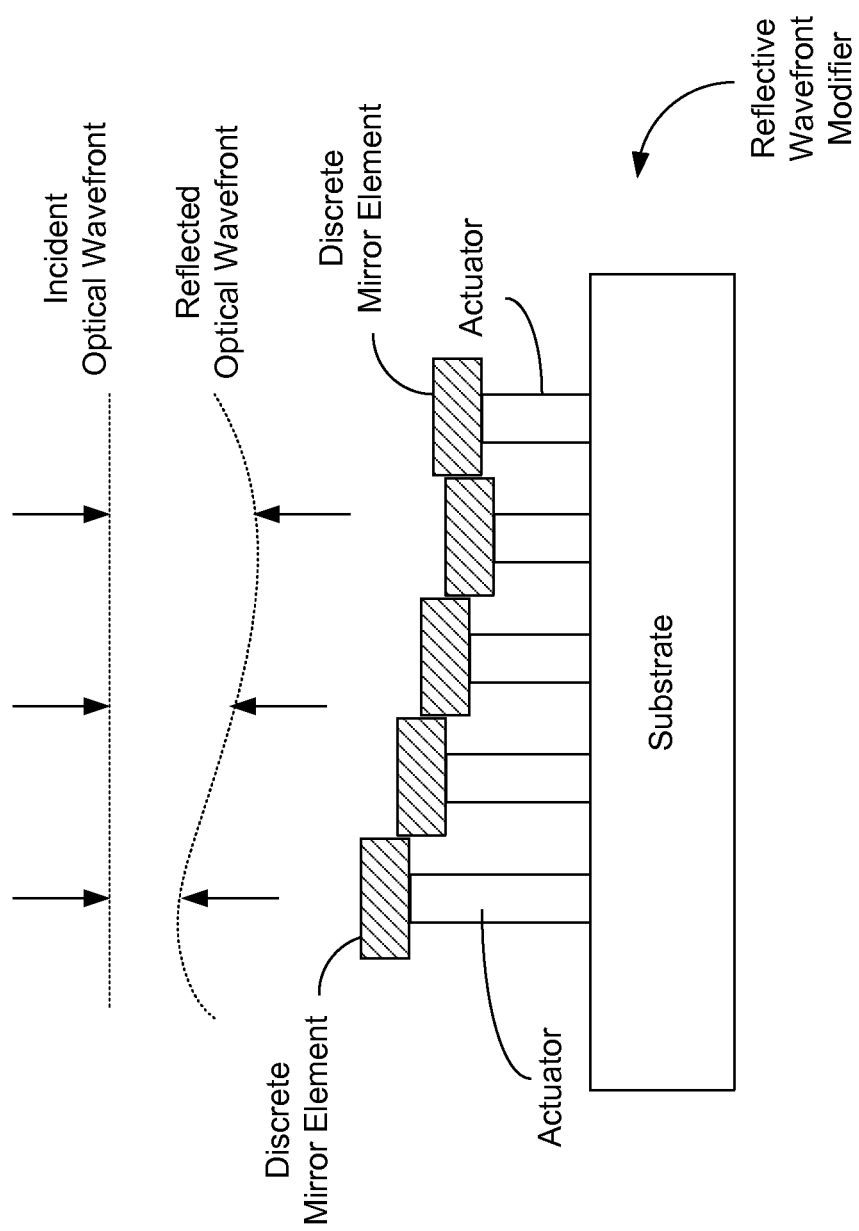

FIGS. 2A, 2B and 2C show three examples of the wavefront modifier in FIG. 1. FIG. 2A shows a reflective wavefront modifier that includes a contiguous deformable mirror coupled to actuator elements that cause the mirror to deform in response to actuator element control signals. FIG. 2B shows a reflective wavefront modifier that includes a discrete deformable mirror elements respectively coupled to actuator elements that cause the mirror elements to change their positions to effectuate a deformable mirror in response to actuator element control signals. FIG. 2C shows a wavefront modifier in FIG. 1 in form of an optically transmissive element by using an transmissive spatial phase modulator that includes actuator elements that cause different transmissive phase regions to produce different local phase values in response to actuator element control signals.

Figure 3:
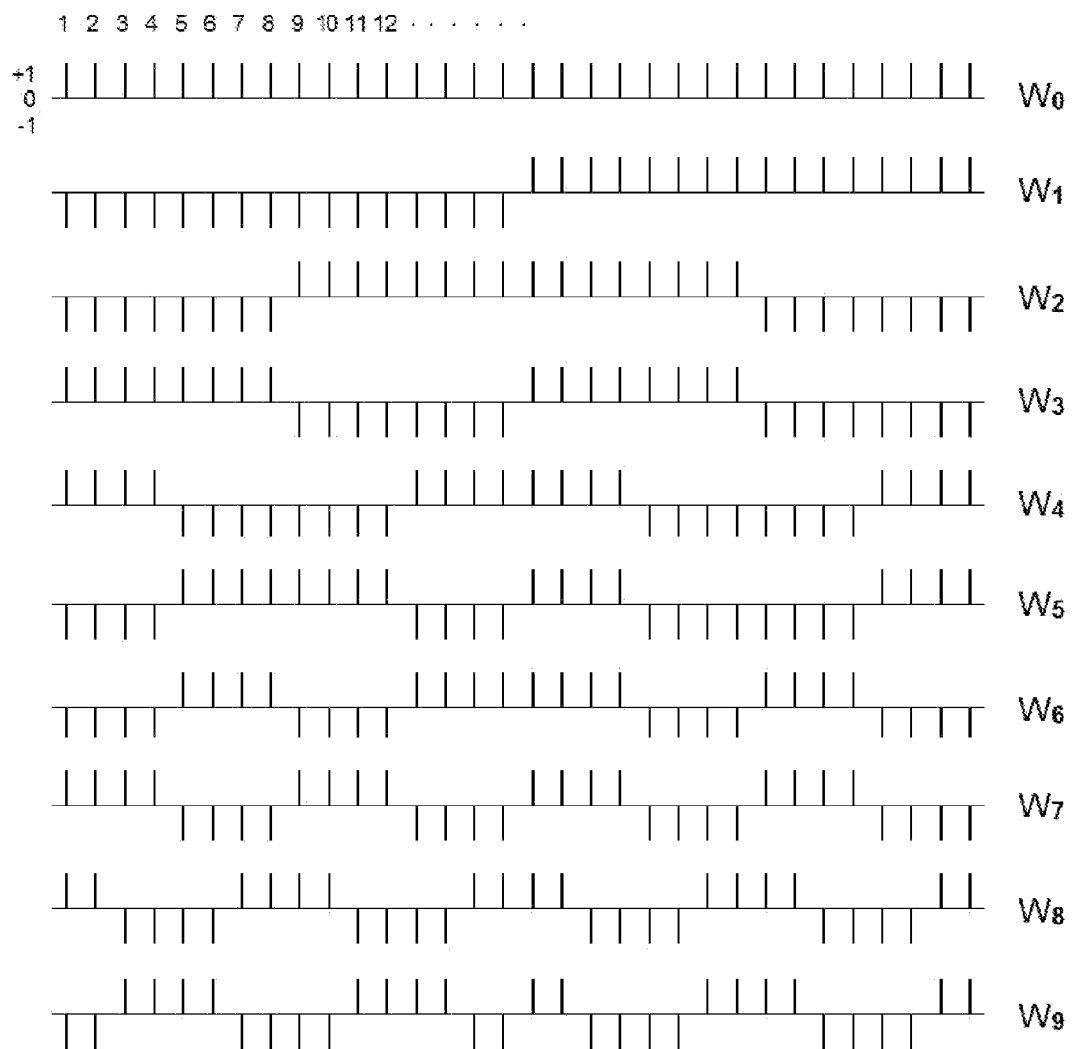
FIGS. 3 and 4 show examples of bi-valued Walsh codes.

In a common construction of the wavefront modifier, each of the segments is controlled by a discrete control signal. The insert in FIG. 1 shows the two example patterns for the segments and the associate control signals as labeled in numbers. The controlling of the wavefront modifier calls for movements of the segments in coordinated ways prescribed by a group of bi-valued functions, namely, the Walsh functions. The Walsh functions can be considered specific assignation of signs (plus and minus) to arrays of discrete positions. The examples shown in FIG. 3 are Walsh functions for a collection of 32 discrete variables. For a given number of independent control valuables, or degrees of freedom, of a physical system there is always a group of Walsh functions, the total number of which is equal to or greater than the degrees of freedom, that completely describe the state of the system in the sense that any possible and arbitrary state of the system can be expressed by a superposition of the Walsh functions. For example, a telescope is equipped with a deformable mirror that is controlled by 225 (in a 15 by 15 array) actuators. Any value assignments for the 225 control signals can be expressed by a superposition of a group of 256 Walsh functions as they form a mathematically complete and orthogonal basis set for 256 numbers, a subset of which (225 numbers) can be associated the real control signals while the remaining numbers are inconsequential.

The use of the Walsh codes for adaptive control of the wavefront modifier in FIG. 1 based on optical sensing provides many benefits over other adaptive optical techniques such as wavefront sensing based on predominantly zonal with the use of Shack-Hartmann sensors which are undesirably insensitive to certain forms of aberration and mirror modes. The bi-valued codes can be used to enable a modal wavefront sensing technique as shown in FIG. 1. The basis functions are derived from Walsh functions. For aberration possessing certain symmetries, such as what is produced in vision and imaging systems, the polar functions are convenient to use because they represent some of the commonly existent aberration patterns as defocusing and astigmatism of the first and higher orders. For adaptive optics systems that are to correct aberration caused by the atmosphere, however, such symmetries do not help. In fact, use of the polar functions may be inefficient in the measurement and correction of the wavefronts in these applications. The examples below show the wavefront sensing and correction techniques that employ deformable mirrors with pixels arranged in Cartesian arrays, which are found in a large number of adaptive optics systems nowadays.

Figure 4:
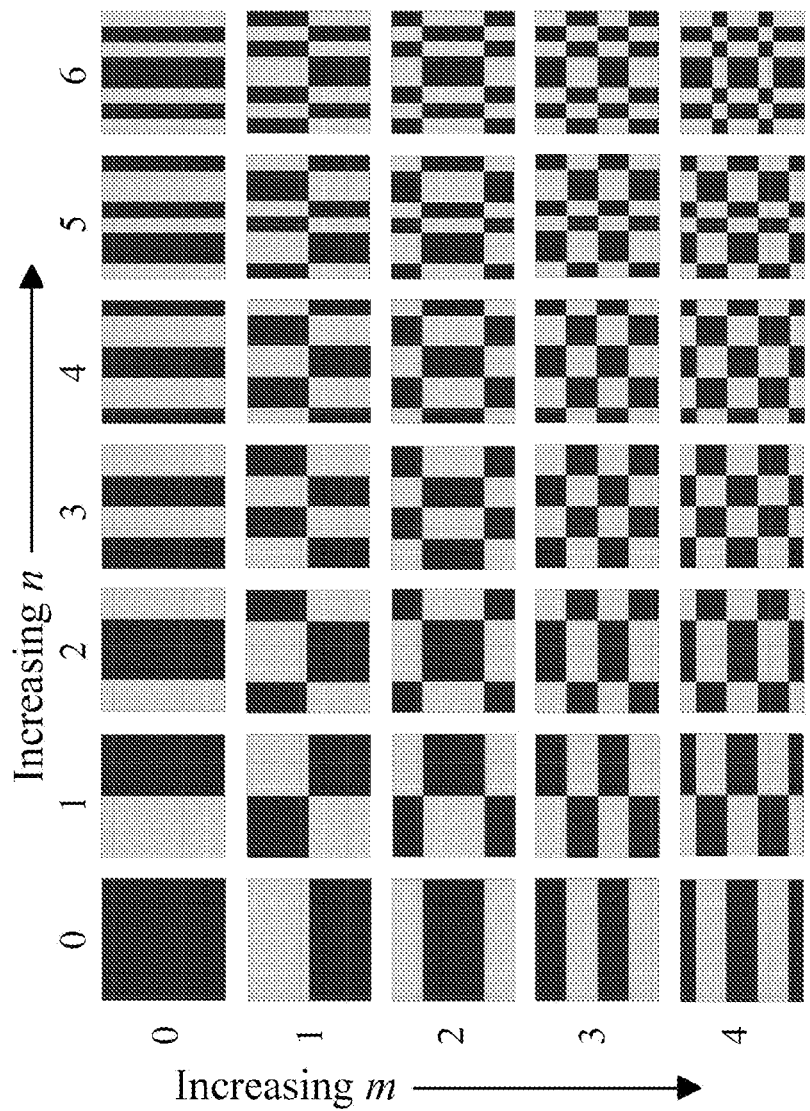

In one implementation of the adaptive optical system in FIG. 1, the wavefront modifier can be a deformable mirror in a rectangular shape with N×N pixels. To conveniently generate the orthogonal functions based on the Walsh series the pixel number should be chosen such that $N=2^\eta$, where $\eta$ is an integer. This deformable mirror is capable of generating N×N mutually orthogonal aberration modes in the form of the 2D Walsh functions, $W_{m,n}$, some of which are shown in FIG. 4. These functions are binary: they can have only two values, 1 and −1. The indices of the functions, m and n, can be arranged in the sequency order, as shown in FIG. 4, so that an ascending index corresponds to an ascending spatial frequency. The completeness and orthonormality of the Walsh series guarantee that any phase function in the rectangular pupil, $\Phi(x, y)$, can be expressed, in the resolution of the given array size, by the following superposition:

$$\Phi(x, y) = \sum_{m,n} a_{m,n} W_{m,n},$$

The above expansion in the phase space can immediately be converted to an expansion of the electric field in the amplitude space on the same functional basis:

$$E(x, y) = E_o e^{-j\sum_{m,n} a_{m,n} W_{m,n}} = E_o \sum_{m,n} B_{m,n} W_{m,n},$$

where each of the coefficients, $B_{m,n}$ is generally dependent on the phase-space coefficients $\{a_{0,0}, a_{0,1}, \ldots, a_{N,N}\}$. To correct the aberration the task is to eliminate all the aberration modes, $W_{m,n}$, from the wavefront.

Figure 5A:
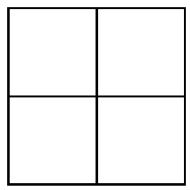
FIGS. 5A, 5B and 5C shows three examples for applying Walsh codes to control deformable pixels in an optical wavefront modifier in FIG. 1.
Figure 5B:
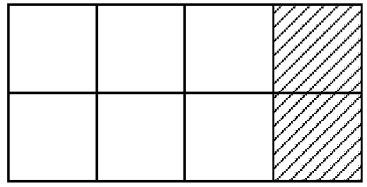
Figure 5C:
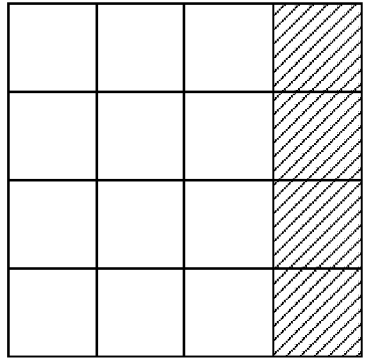

As shown in FIG. 1, the wavefront modifier can be in different geometries and shapes. For a wavefront modifier with M number of actuator elements, the $2^n$ number of Walsh codes should be greater than M number of actuator elements in the wavefront modifier in FIG. 1. FIGS. 5A, 5B and 5C illustrate three examples. In FIG. 5A, a 4-pixel deformable mirror can be controlled by 4 Walsh codes. In FIGS. 5B and 5C, there are some unused Walsh codes.

Figure 6:
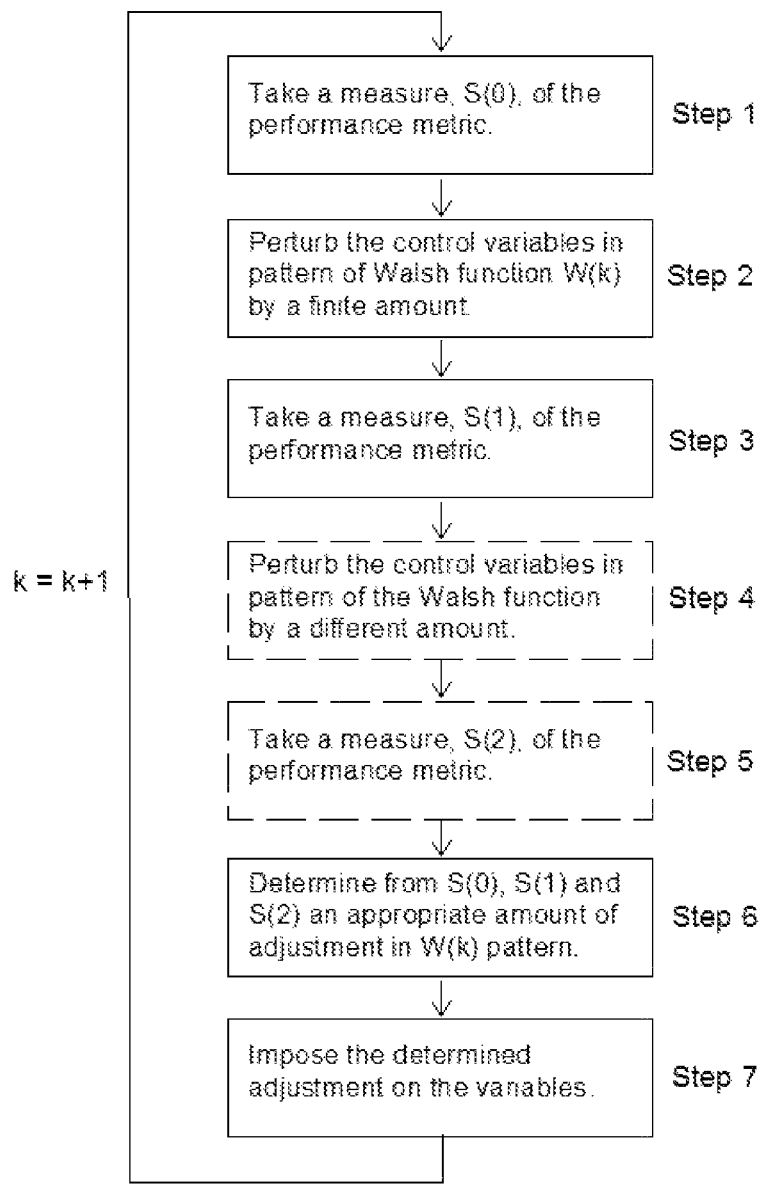
FIG. 6 shows an example of a subrounte for controlling the optical wavefront modifier in FIG. 1 based on optical sensing and adaptive control based on a performance metric.

It many practical cases it is a good approximation to consider that a linear change of a control variable for the wavefront modifier causes a linear change in the optical phase of the corresponding segment. Under the approximation it can be shown that when the control variables change their values in accordance to a Walsh-function pattern the light intensity of the transformed wavefront at any position varies in a simple sinusoidal fashion. This simple relationship between the perturbation of the control variables and the resultant intensity changes allows for simple and reliable algorithms that deliver the system to an extreme of a performance metric that is derived arithmetically from light intensities measured from the transformed field. The sequence of steps shown in FIG. 6 is an exemplary subroutine for constructing such an algorithm; the boxes in dashed lines indicate steps that may be omitted. The overall algorithm for achieving a specific goal usually consists of applying the subroutine to every Walsh-function patterns. As mentioned previously, the total number of Walsh-function patterns available for optimization is equal to or greater than the number of control variables. The use of all the Walsh-function patterns enables the optimal convergence of the wavefront modifier; it is, however, unnecessary for all the Walsh-function patterns to be controlled in practice because the use of a subgroup of predominantly important patterns can sometimes deliver satisfactory results.

Figure 7:
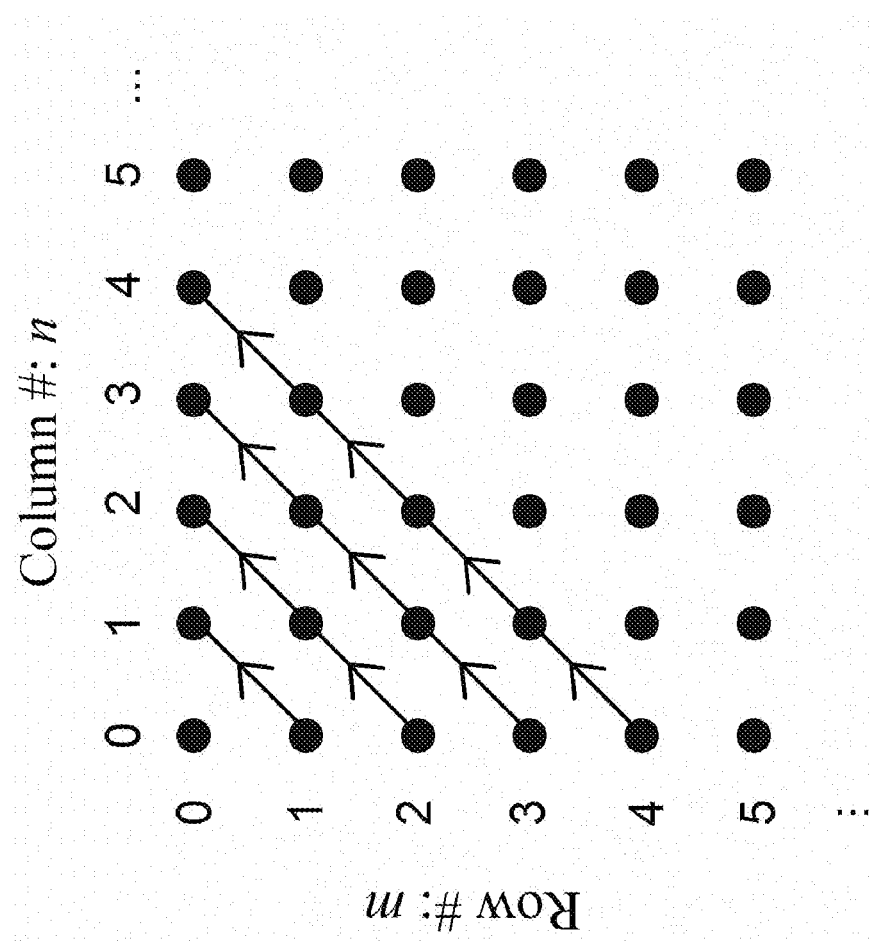
FIG. 7 shows an example of a cycling pattern for the modal evaluation and correction routine.

In the numerical model, the 255 (256 minus the piston mode) modes are updated following a simple sequence illustrated in FIG. 7. With the sequence, all the modes are given the same frequency of updating and arranged roughly from low spatial frequency to high spatial frequency modes. These 255 steps form a compensation cycle which can be repeated. The sequence of the first a few low frequency modes is the following:

$W_{1,0}, W_{0,1}, W_{2,0}, W_{1,1}, W_{0,2} \ldots$

At present, adaptive optics (AO) systems rely heavily on computation. In phase-conjugate AO systems wavefronts are first reconstructed, followed by computing the command signals; in high-contrast imaging electric fields are computed in order for the deformable mirrors to produce countering effects. While these techniques have allowed great advances the computations are often major impediments to increasing the speed of the systems. AO systems with less or no computation, implementable using analog circuits, have been explored since the early days [1]; more recent effort in this direction has produced remarkable results [2]. Questions remain, however, whether analog-control AO can provide reliable corrections and whether high-contrast imaging can be realized with analog controls at all. In this paper we show that a modal optimization of deformable mirrors, demonstrated recently, permits reliable analog control of AO systems for phase-conjugate corrections and high-contrast imaging.

The proposed computation-free AO is based on a mirror optimization technique using binary modal functions [3,4]. It has been demonstrated in numerical simulation and experiments that, under the guidance of focal-plane metrics, deformable mirrors can be effectively controlled using binary modes derived from the Walsh functions.

The unique multiplication properties of the Walsh functions provide the following for an optical field in the pupil plane:

$$U(x, y) = U_o \exp\left(-j\sum_{k=0}^{\infty} a_k W_k\right) = U_o \sum_{k=0}^{\infty} b_k W_k, \quad (1)$$

which states that the expansion of the phase function using the Walsh functions, $W_k$, can be converted to a linear superposition of fields in modes of the same basis set. This conversion leads to a uniquely simple relationship between the light intensity in the focal plane and any one modal coefficient:

$$I = C_0 + C_1 [\sin(a_k + \phi)]^2. \quad (2)$$

where $C_0$, $C_1$ and $\phi$ are all independent of $a_k$. This equation is valid anywhere (on-axis and off-axis) in the focal plane, for any amplitude of the modal coefficient, and whether or not there is any amplitude aberration. For continuous-facesheet mirrors Eq. (2) is a good approximation, although it is not strictly obeyed.

Eq. (2) is the mathematical basis for the proposed computation-free AO systems. For phase-conjugate applications the control electronics should be fashioned to maximize the on-axis light intensity through perturbing the mirror in all the Walsh-function modes accessible by the mirror. It can be shown that the average light intensity in any focal-plane area, such as a dark-hole area, is also governed by Eq. (2). For high-contrast imaging the controller should seek minimization of the intensity in the dark hole. These control goals can be realized with analog circuitry using the multi-dither principle, in which the mirror is perturbed in the Walsh-function modes.

Figure 8:
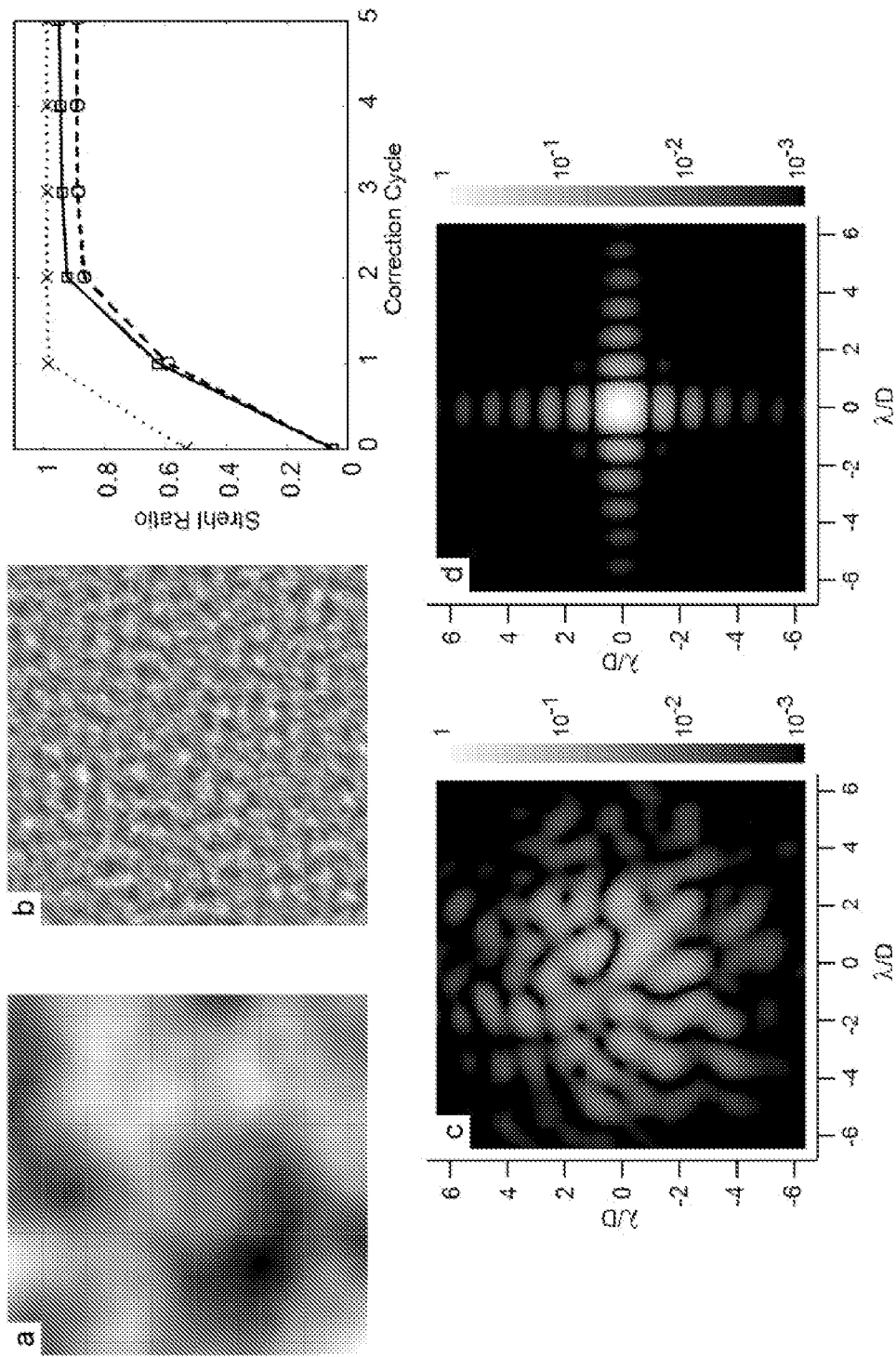
FIG. 8 shows an example of a phase-conjugate correction based on the optical sensing and adaptive control in FIG. 1. Graphs (a) and (b) are the phase screen and amplitude screens, respectively; (c) and (d) are PSF in logarithm scale before and after correction, respectively. The upper right plots show evolutions of Strehl ratio: solid curve is for severe aberration corrected using the continuous facesheet mirror; the dotted curve is for a weaker aberration corrected using the same mirror; dashed curve is for the same severe aberration corrected using a segmented mirror.

Both phase and amplitude aberrations are considered in our simulations. A continuous facesheet mirror with 16×16 actuators is used. The 256 actuator heights are adjusted modally using the 256 Walsh-function modes. In the simulation, the modes are adjusted individually; a sequence of optimizing all the 256 modes constitutes a correction cycle. Shown in FIG. 8 are typical results of maximizing the on-axis intensity for phase-conjugation. The phase aberration has a RMS value of 0.252; the log-amplitude has a mean square deviation of 0.2. It generally takes two correction cycles for the mirror to converge to a nearly optimal state; for weak aberrations only one correction cycle is needed.

Substantially more correction cycles are needed for dark holes to be optimized. This is because the extreme contrasts require extremely accurate deformation of the mirror. To create a dark hole in the focal plane the star peak can be first optimized using the phase-conjugate procedure, followed by the minimization of the average light intensity in the dark hole, or minimization of the inversed contrast.

Figure 9:
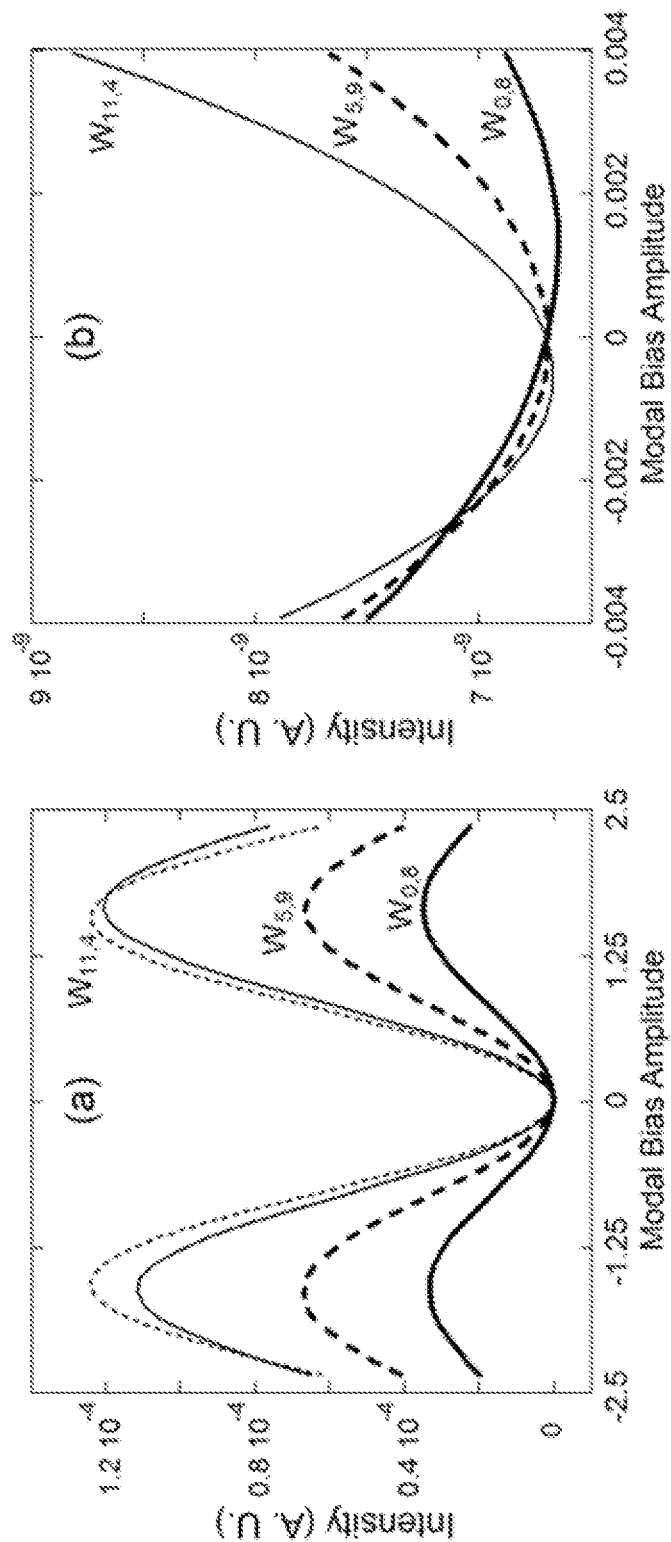
FIG. 9 shows average light intensity of the dark hole as a function of the Walsh-mode amplitude. Average light intensity of the dark hole as function of the Walsh-mode amplitudes, shown in large scales, (a), and zoom-in, (b). All curves are for the continuous facesheet mirror except for the thin dash line in (a), which is for a segmented mirror.

Phase and amplitude screens similar to the previous example are used in simulating a dark hole creation. A mask of gradual transmission in a Sonine function is included as static coronagraph[5]. The general validity of Eq. (2), which encompasses the presence of coronagraphic elements, suggests that the average intensity of a dark-hole varies in sinusoidal fashions with changing modal amplitudes. The calculated results, shown in FIG. 9, confirm that Eq. (2) is strictly followed for a segmented mirror (the thin dashed curve) and that the relationship is approximately followed when a continuous-facesheet mirror is used (all other curves).

Figure 10:
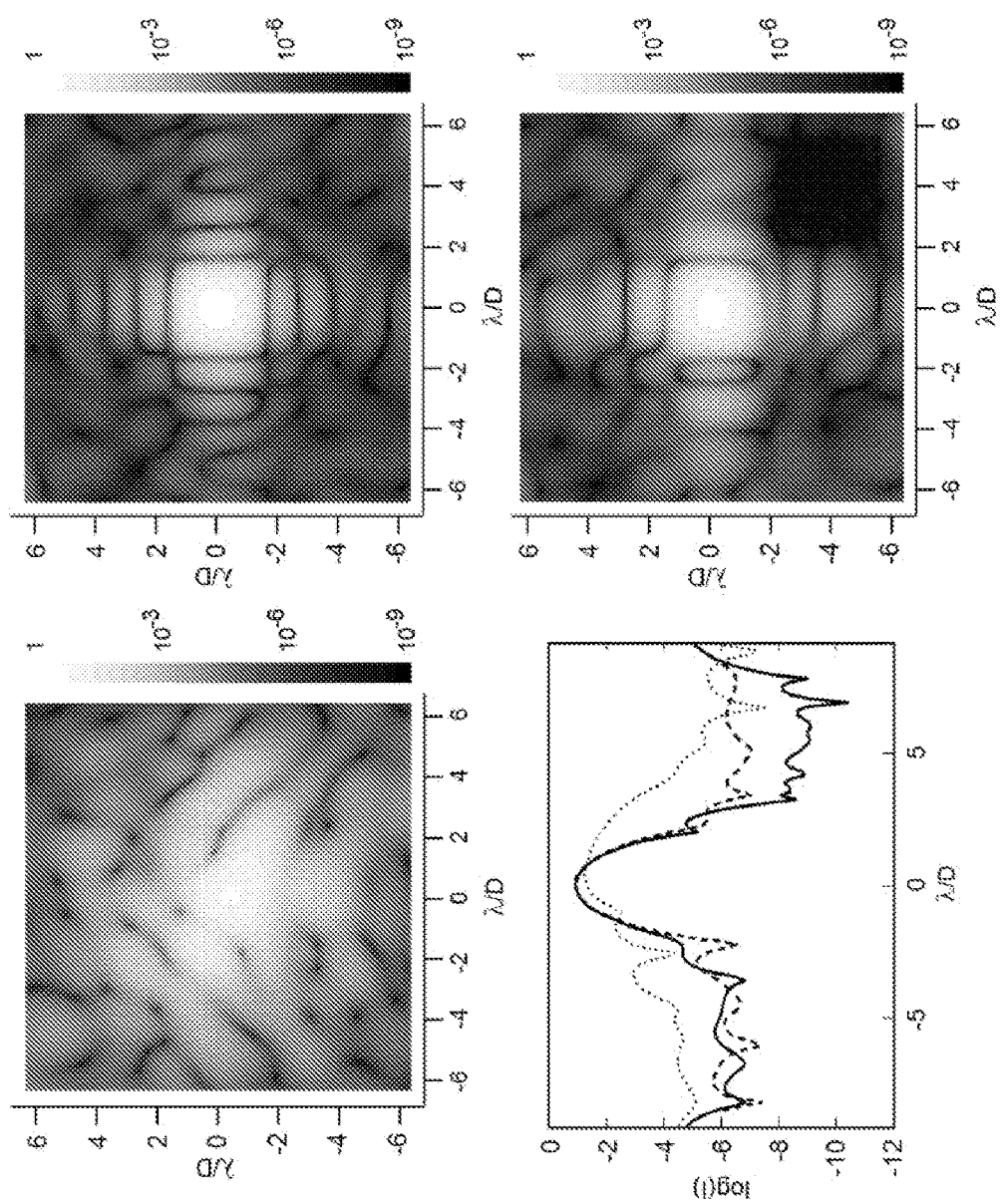
FIG. 10 shows modal optimization for dark-hole creation. Modal optimization for dark-hole creation. (a) is the starting PSF under the phase and amplitude aberrations; (b) is after phase-conjugate correction; (c) is after dark-hole optimization. The lower left graph shows the diagonal intensity profiles for the three states.

The results of a simulated dark-hole creation are shown in FIG. 10. Three phase-conjugation cycles boost the contrast from $1.3 \times 10^{-3}$ to $4.0 \times 10^{-6}$. Subsequent 35 cycles of minimizing the light intensity in the dark hole improve the contrast to $2 \times 10^{-8}$. Contrasts on the order of $10^{-9}$ to $10^{-10}$ have also been obtained using inputs of less severe aberrations.

It is shown that the Walsh-function modes can be used to optimize deformable mirrors in phase-conjugate and high-contrast imaging. As the control requires neither computation nor knowledge of the coronagraphic optics it should allow implementations using analog circuitry for high speeds. The uniquely simple relationship between the cost functions and the Walsh modal coefficients makes the convergences reliable and virtually free of local-minimum hazards.

For various applications of wavefront transforms, the performance metric can be different from one to the other and accordingly the formula for determining the appropriate amount of adjustment for the variables, Step 6 in the subroutine, can also be different. The following are some examples:

Phase-Conjugate Correction

In phase-conjugate correction the goal is to best compensate the wavefront aberration. An appropriate performance metric is the light intensity sensed by one photosensing elements or the average intensity sensed by a group of photosensing pixels. In the presence of a beacon, the pixels upon which the beacon is focused can be used to construct the performance metric. In the absence of a beacon, the pixels corresponding to a conspicuous spot in the image can be used to construct the beacon. To compensate the aberration in the wavefront, the algorithm should be structured to maximize the performance metric for each adjustment of the variables in the Walsh-function patterns.

High-Contrast Imaging

For high-contrast imaging applications, such as the direct observation of faint stellar companions in astronomical imaging, an appropriate performance metric can be the average light intensity in an observation field, which is usually adjacent to the focal point of the star, divided by the intensity of the star. By minimizing this metric the wavefront modifier is led to a shape that maximize the dynamic range of imaging for the chosen observation field.

Fluorescence and Multi-Photon Microscopy

For fluorescence and multi-photon imaging, the performance metric can be similar to what is employed for phase-conjugate imaging: the light intensity in pixels that correspond to a conspicuous spot in the image can be used as the performance metric. It is the intensity of the fluorescent or the up-converted photons that are measured to form the performance metric.

Free-Space Laser Communication

The performance metric in this case can simply be the intensity sensed by the photodetector in the receiver.

Optical Trapping and Beam Splitting

To form a plural of movable light spots for optical trapping, the performance metric can be the summation of the inverses of the light intensities at the trapping locations. The algorithm should seek the minimization of the metric.

Coherent Beam Combining

To combine a plural of coherent laser beams, the performance metric can simply be the light energy in the desired direction to which the combined laser beam propagates.

Figure 11:
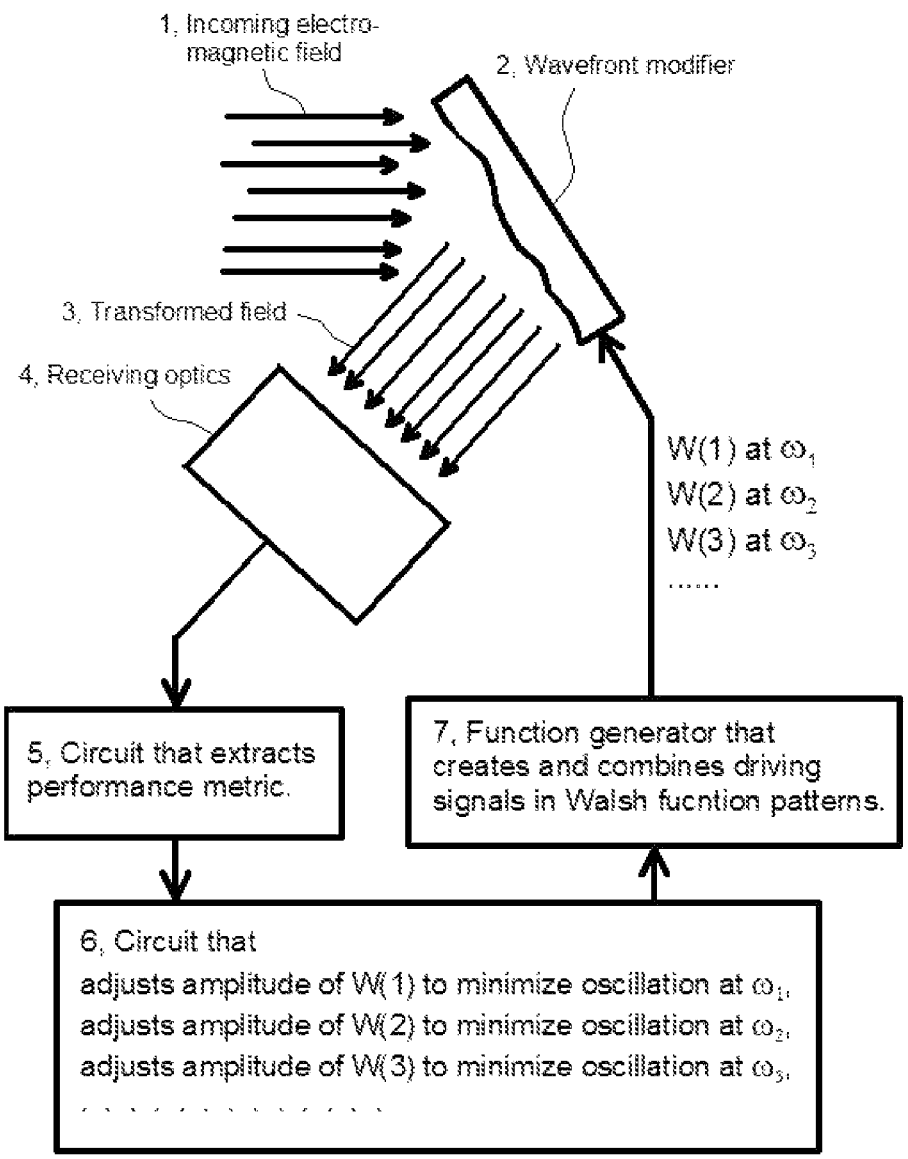
FIG. 11 shows an example implementation of the system in FIG. 1 based on a frequency modulation scheme.

Due to the algorithmic simplicity, the process of optimizing the wavefront modifier for the above-mentioned applications can be implemented using analog circuitry or an analog-digital hybrid. Shown in FIG. 11 is an architectural design of the control electronics. The performance metric is derived from the receiving optics, typically including an sensor array or a single photodetector; a function generator is employed to create electric signals, distributed to the control variables in forms of Walsh functions, with combinations of DC and dithering amplitudes. As the optimization of the system is associated with either the minimization or the maximization of the performance metric, a circuit can be constructed to seek the DC components that minimize the oscillation of the performance metric at the fundamental dither frequencies. The use of analog circuits to perform these control tasks can result in fast overall speed of the system. These control tasks can also be accomplished with the use of digital electronics or a combination of analog and digital electronics. Referring to FIG. 4, more specifically, circuit 5 constructs a signal from measured light intensities at one or more locations in the receiving optics and extract amplitudes of oscillations at a series of different frequencies; the function generator 7 distributes signals to the control points of the wavefront modifier in the form of superpositions of a series of Walsh functions, each of which has an independent amplitude composed of a DC term and a term oscillating at one of the frequencies that is extracted by 5; circuit 6, in communication with 7, serves to adjust the DC components in the amplitudes of the Walsh functions towards the value that minimizes the amplitudes of the oscillations measured by 5 and corresponds to the desired outcome.

Figure 12:
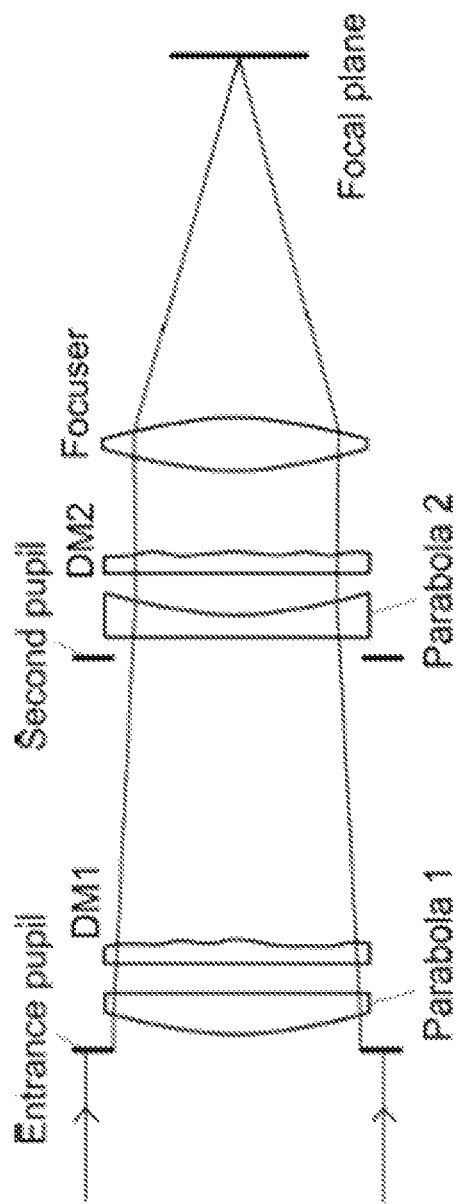
FIG. 12 shows an application of the adaptive control in FIG. 1 in a telescope system.

One of the frontiers of optics today is direct imaging of exoplanets. The extreme contrast in brightness between exoplanets and their parent stars requires precise control of wavefronts from star-planet systems. With the help of adaptive optics (AO) great strides have been made towards such imaging instruments. Substantial hurdles remain, however, in treating non-ideal pupils, imprecise knowledge of the deformable mirrors and wavefront errors originated from imperfect optics and from the atmosphere. The use of sequential deformable mirrors has been proposed for creating symmetric dark holes, for correcting wavefronts aberrated in both phase and amplitude, and for use with complex pupil geometries. Reported methods for controlling sequential deformable mirrors rely on modeling of the optical systems in order to convert the image-plane measurements to control signals. Reshaping mirror surfaces for specific purposes can be approached algorithmically through orthonormal adjustments of the variables in the control space. The control of two deformable mirrors for high contrast imaging is shown in FIG. 12, which is free of modeling and computation. An additional and strong motivation of this study is to explore a system analogous to the phase-induced amplitude apodization (PIAA) but without the need for specialty mirrors.

The imaging system proposed and studied here is schematically shown in FIG. 12. The two deformable mirrors are arranged in a series. Each deformable mirror is paired with a conventional (parabolic) mirror which serves to reduce the strokes of the deformable mirror for broadband performance. Both the entrance pupil and the second pupil are assumed to be hard-edged. The two deformable mirrors are assumed identical, possessing the same influence functions of a continuous face-sheet. There are 1024 actuators for each mirror, arranged in a 32 by 32 square array.

In our control algorithm the two deformable mirrors are optimized together based on the feedback from an image-plane metric. For this purpose a global (engaging all the degrees of freedom of the system) and orthonormal set of 2048 Walsh functions is employed. Superpositions of the 2048 functions cover all possible combinations of the 2048 actuator heights, and therefore, all possible mirror surfaces. The image-plane metric is the integral of light intensity over the hark hole(s) divided by the on-axis intensity:

$$\text{metric} = \frac{\langle I_{dh} \rangle}{I_o}.$$

The control algorithm uses three metric values that are measured under mirror state of the present, the present plus and the present minus a Walsh-function perturbation to the actuator heights, respectively; the metric values then yield an optimizing step for the Walsh-function mode which involves an adjustment for all the 2048 actuators. Optimizing each of the 2048 Walsh modes once in a sequence completes an optimization cycle which is usually repeated.

Our tests indicate that it is feasible to obtain high-contrast PSF using an optical system with two serially linked deformable mirrors and conventional parabolic mirrors as shown in FIG. 12. The control algorithm for the deformable mirrors takes advantage of an orthonormal optimization scheme in the control space. This system is potentially fast, low cost and very flexible as it eliminates two frequent and significant burdens: computation and manufacturing of specialty mirrors. In addition, this system is capable of correcting wavefront errors in both phase and amplitude.

The above disclosed technology can be implemented in various applications.

For example, an electromagnetic-field transform system can be provided for employing a wavefront modifier having a plural of control variables whose values are optimized from time to time, for achieving and maintaining an intended transform, through adjustments of Walsh-function amplitudes associated with said values. In one implementation, the wavefront modifier can be a deformable mirror or a spatial light modulator having a plural of control variables that determine the spatially varied phase modification experienced by the electromagnetic fields.

For example, an electromagnetic-field transform system can be provided for employing a wavefront modifiers having a plural of control variables whose values are optimized from time to time, under the guidance of a performance metric whose minimization or maximization corresponds to the fulfillment of the intended transform, through adjustments of Walsh-function amplitudes associated with said values. In one implementation, the wavefront modifier can be a deformable mirror or a spatial light modulator having a plural of control variables that determine the spatially varied phase modification experienced by the electromagnetic fields.

For example, an imaging system can be provided for employing a deformable mirror having a plural of control variables whose values are optimized from time to time through adjustments of Walsh-function amplitudes associated with said values to maximize or minimize a metric derived from the light intensities measured from the image-forming plane.

For example, a microscope system can be provided for employing a deformable mirror having a plural of control variables whose values are optimized from time to time through adjustments of Walsh-function amplitudes associated with said values to maximize the light emitted by a specimen, under the excitation of an excitation light, and received by one or a plural of light sensing elements.

For example, a free-space laser communication system can be provided for employing a deformable mirror having a plural of control variables whose values are optimized from time to time through adjustments of Walsh-function amplitudes associated with said values to maximized the light received by the photodetector in the receiver.

For example, an optical trapping device can be provided for employing a deformable mirror or a spatial light modulator having a plural of control variables whose values are optimized from time to time through adjustments of Walsh-function amplitudes associated with said values to maximize light intensities at desired locations for trapping objects.

For example, a laser beam combing system can be provided for employing a deformable mirror have a plural of control variables whose values are optimized from time to time through adjustments of Walsh-function amplitudes associated with said values to maximized the optical energy propagating in a single direction.

For example, an imaging system can be provided for employing a deformable mirror having a plural of control variables whose values are optimized from time to time, under the operation of an analog circuit or an analog-digital hybrid circuit, through adjustments of Walsh-function amplitudes associated with said values to minimize the oscillations at a plural of frequencies of a metric derived from the light intensities in the image-forming plane while dithering said control variables in accordance to said Walsh functions at said frequencies.

For example, a microscope system can be provided for employing a deformable mirror having a plural of control variables whose values are optimized from time to time, under the operation of an analog circuit or an analog-digital hybrid circuit, through adjustments of Walsh-function amplitudes associated with said values to minimize the oscillation at a plural of frequencies of the light emitted, under the excitation of an excitation light, by a specimen and received by one or a plural of light sensing elements while dithering said control variables in accordance to said Walsh functions at said frequencies.

For example, a free-space laser communication system can be provided for employing a deformable mirror having a plural of control variables whose values are optimized from time to time, under the operation of an analog circuit or an analog-digital hybrid circuit, through adjustments of Walsh-function amplitudes associated with said values to minimize the oscillations at a plural of frequencies of the light received by the photodetector in the receiver while dithering said control variables in accordance to said Walsh functions at said frequencies.

For example, an optical trapping device can be provided for employing a deformable mirror or a spatial light modulator having a plural of control variables whose values are optimized from time to time, under the operation of an analog circuit or an analog-digital hybrid circuit, through adjustments of Walsh-functions amplitudes associated with said values to minimize the oscillations at a plural of frequencies of light intensities at desired locations while dithering said control variables in accordance to said Walsh functions at said frequencies.

For example, a dynamic diffractive optical device can be provided to include a variable wavefront modifier possessing a plural of control points for exerting spatially varied optical path lengths across a beam of light, and a control unit that executes functions including acquiring information about the light after encountering said variable wavefront modifier and distributing two-valued control signals to said control points in patterns of Walsh functions with amplitudes based on said information. In some implementations, the variable wavefront modifier can be a deformable mirror or a spatial light modulator.

For example, an imaging system can be provided to include a lens assembly, a deformable mirror providing wavefront modification that is determined by the values of a plural of control points, a light sensor array that receives light from the deformable mirror, and a control unit that repeatedly executes functions including acquiring feedback signals from said sensor array and distributing two-valued control signals to said control points in patterns of Walsh functions with amplitudes based on said feedback signals.

For example, an imaging system can be provided to include a light source for illuminating an object to be imaged, a scanning mechanism for steering the propagation direction of light, a lens assembly for receiving the light, a light sensor array for sensing the light, a deformable mirror or a spatial light modulator, placed between said object and said light sensor array, providing wavefront modification that is determined by a plural of control points, and a control unit that repeatedly executes functions including acquiring feedback signals from said sensor array and distributing two-valued control signals to said control points in patterns of Walsh functions with amplitudes based on said feedback signals.

For example, a microscope system can be provided to include a light source for illuminating and exciting a specimen, a lens assembly, a deformable mirror, placed between said light source and said specimen, providing wavefront modification that is determined by the values of a plural of control points, a light sensor array that receives light from the deformable mirror, and a control unit that repeatedly executes functions including acquiring feedback signals from said sensor array and distributing two-valued control signals to said control points in patterns of Walsh function with amplitudes based on said feedback signals.

For example, a free-space laser communication system can be provided to include a light source, a deformable mirror providing wavefront modification that is determined by the values of a plural of control points, a light receiver that receives light from the deformable mirror, and a control unit that repeatedly executes functions including acquiring feedback signals from said receiver and distributing two-valued control signal to said control points in patterns of Walsh functions with amplitudes based on said feedback signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An optical system having an adaptive control, comprising:

an optical wavefront modifier configured to modify at least a spatial phase pattern of an optical wavefront of an optical input signal to produce a modified optical signal having a modified optical wavefront, the optical wavefront modifier including an array of actuator elements at different locations each operable to modify at least a local phase of the optical wavefront of the modified optical signal, the actuator elements coupled to receive actuator element control signals, respectively, to effectuate respective local phase values at different locations of the modified optical wavefront;

an optical sensor unit located in an optical path of the modified optical signal from the adaptive optical wavefront modifier and configured to convert the modified optical signal into an optical sensor signal containing information of light intensities measured at different locations on the modified optical wavefront; and a control electronic unit coupled to the optical sensor unit to receive the optical sensor signal and coupled to the optical wavefront modifier to generate the actuator element control signals based on the optical sensor signal, the control electronic unit configured to generate different sets of the actuator element control signals based on different sets of bi-valued Walsh codes, respectively, to generate different sets of local phase values at the optical wavefront modifier that are adaptive to information of the measured light intensities in the optical sensor signal received at the optical sensor unit over time, wherein the control electronic unit operates to adjust performance metrics based on the measured light intensities at different locations of the modified optical wavefront to determine Walsh code coefficients respectively assigned to the bi-valued Walsh codes based on a relationship between each measured light intensity and a corresponding Walsh code coefficient, wherein a number of bi-valued Walsh codes is equal to or greater than a number of actuator elements in the array of actuator elements of the optical wavefront modifier.

2. The system as in claim 1, wherein:
the control electronic unit is configured to use first obtained information in the optical sensor signal received at the optical sensor unit to apply first bi-valued Walsh codes to produce first actuator element control signals which produce a first modified optical wavefront via the optical wavefront modifier, and, to subsequently use second obtained information in the optical sensor signal subsequently received at the optical sensor unit to apply second bi-valued Walsh codes different from the first bi-valued Walsh codes to produce second actuator element control signals which produce a second modified optical wavefront via the optical wavefront modifier that is a superposition of the first modified optical wavefront and additional optical wavefront modification produced by the optical wavefront modifier associated with the second bi-valued Walsh codes.

3. The system as in claim 2, wherein:
in generating respective actuator element control signals for the first or second bi-valued Walsh codes, the control electronic unit is configured to process the received optical sensor signal to generate a signal performance metric for the received optical sensor signal and uses the signal performance metric and the respective bi-valued Walsh codes to determine intermediate actuator element control signals by perturbing the actuator element control signals and measuring the signal performance metric from the received optical sensor signal caused by the perturbing of the intermediate actuator element control signals.

4. The system as in claim 3, wherein:
the signal performance metric includes a light intensity at a selected location of the optical sensor unit.

5. The system as in claim 3, wherein:
the signal performance metric includes an averaged light intensity at several selected locations of the optical sensor unit.

6. The system as in claim 3, wherein:
the signal performance metric includes an image contrast measured at the optical sensor unit.

7. The system as in claim 2, wherein:
the control electronic unit is configured to use a portion of selected sets of bi-valued Walsh codes from available sets of bi-valued Walsh codes.

8. The system as in claim 7, wherein:
the portion of selected sets of bi-valued Walsh codes correspond to low frequency modes for the modified optical signal.

9. The system as in claim 7, wherein:
the first bi-valued Walsh codes correspond to lower frequency modes than frequency modes of the second bi-valued Walsh codes.

10. The system as in claim 1, wherein:
the optical wavefront modifier includes a deformable mirror which operates to produce local phase values at different locations by controlling the actuator elements to produce reflected light as the modified optical signal.

11. The system as in claim 1, wherein:
the optical wavefront modifier includes a spatial light modulator that produces the modified optical signal.

12. The system as in claim 1, wherein:
the optical wavefront modifier produces the modified optical signal by optical transmission.

13. The system as in claim 1, wherein:
the optical wavefront modifier includes different segments coupled to the actuator elements, respectively, where the different segments interact different spatial portions of the optical wavefront to effectuate the respective local phase values at different locations of the modified optical wavefront.

14. The system as in claim 1, wherein:
the optical wavefront modifier includes a continuous surface that is coupled to the actuator elements, respectively, to effectuate respective local phase values at different locations of the modified optical wavefront.

15. The system as in claim 1, wherein:
the optical sensor unit includes an array of optical sensors for sensing the light directed from the optical wavefront modifier.

16. A method for operating an optical system having an adaptive control, comprising:
applying actuator element control signals to actuator elements at different locations of an optical wavefront modifier to modify at least a spatial phase pattern of an optical wavefront of an optical input signal to produce a modified optical signal having a modified optical wavefront, wherein, the actuator elements are operated to effectuate respective local phase values at different locations of the modified optical wavefront;
measuring the modified optical signal to obtain an optical sensor signal containing information of light intensities measured at different locations on the modified optical wavefront;
adjusting performance metrics based on the measured light intensities at different locations of the modified optical wavefront to determine Walsh code coefficients assigned to a number of bi-valued Walsh codes, based on a relationship between each measured light intensity and a corresponding Walsh code coefficient;
providing an adaptive control based on the Walsh code coefficients and the corresponding bi-valued Walsh codes over the actuator elements at different locations of the optical wavefront modifier, respectively, based on the information of the measured light intensities at different locations on the modified optical wavefront in the optical sensor signal to correct distortions in the optical wavefront of the optical input signal.

17. The method as in claim 16, comprising:
at a first time, using first obtained information in the optical sensor signal to apply first bi-valued Walsh codes to produce first actuator element control signals which produce a first modified optical wavefront via the optical wavefront modifier, and,
at a second time subsequent to the first time, using second obtained information in the optical sensor signal to apply second bi-valued Walsh codes different from the first bi-valued Walsh codes to produce second actuator element control signals which produce a second modified optical wavefront via the optical wavefront modifier that is a superposition of the first modified optical wavefront and additional optical wavefront modification produced by the optical wavefront modifier associated with the second bi-valued Walsh codes.

18. The method as in claim 17, wherein:
in generating respective actuator element control signals for the first or second bi-valued Walsh codes, the method further comprises:
processing the optical sensor signal to generate a signal performance metric;
using the signal performance metric and the respective bi-valued Walsh codes to determine intermediate actuator element control signals by perturbing the actuator element control signals and measuring the signal performance metric from the received optical sensor signal caused by the perturbing of the intermediate actuator element control signals; and based on an impact to the signal performance metric caused by the perturbing of the intermediate actuator element control signals, generating the respective actuator element control signals for the first or second bi-valued Walsh codes.

19. The method as in claim 16, further comprising:

using only a portion of selected sets of bi-valued Walsh codes from available sets of bi-valued Walsh codes in the adaptive control.

20. The method as in claim 19, comprising:

first using bi-valued Walsh codes corresponding to low frequency modes for the modified optical signal and then using bi-valued Walsh codes corresponding to higher frequency modes for the modified optical signal.

21. The method as in claim 16, comprising:

modulating the actuator element control signals at different modulation frequencies that correspond to different bi-valued Walsh codes, respectively; and simultaneously optimizing the actuator element control signals that correspond to different bi-valued Walsh codes, respectively, by measuring signal components in the optical sensor signal that correspond to the different modulation frequencies.

22. An optical system having an adaptive control, comprising:

an optical wavefront modifier configured to modify at least a spatial phase pattern of an optical wavefront of an optical input signal to produce a modified optical signal having a modified optical wavefront, the optical wavefront modifier including an array of actuator elements at different locations each operable to modify at least a local phase of the optical wavefront of the modified optical signal, the actuator elements coupled to receive actuator element control signals, respectively, to effectuate respective local phase values at different locations of the modified optical wavefront, wherein the optical wavefront modifier operates the actuator elements to modulate amplitudes of local phase values caused by the actuator elements at different modulation frequencies;

an optical sensor unit located in an optical path of the modified optical signal from the adaptive optical wavefront modifier and configured to convert the modified optical signal into an optical sensor signal containing information of light intensities measured at different locations on the modified optical wavefront and information on modulated amplitudes of local phase values at the different modulation frequencies; and a control electronic unit coupled to the optical sensor unit to receive the optical sensor signal and coupled to the optical wavefront modifier to generate the actuator element control signals based on the optical sensor signal, the control electronic unit configured to generate different sets of the actuator element control signals based on different sets of bi-valued Walsh codes, respectively, to generate different sets of local phase values at the optical wavefront modifier that are adaptive to information of the measured light intensities in the optical sensor signal received at the optical sensor unit, wherein the control electronic unit operates to adjust performance metrics based on the measured light intensities at different locations of the modified optical wavefront to determine Walsh code coefficients respectively assigned to the bi-valued Walsh codes based on a relationship between each measured light intensity and a corresponding Walsh code coefficient and to generate the actuator element control signals to minimize oscillations at the modulation frequencies that are measured at the optical sensor unit.

23. The system as in claim 22, wherein:

the performance metrics include a light intensity at a selected location of the optical sensor unit.

24. The system as in claim 22, wherein:

the performance metrics include an averaged light intensity at several selected locations of the optical sensor unit.

25. The system as in claim 22, wherein:

the performance metrics include an image contrast measured at the optical sensor unit.

26. The system as in claim 22, wherein:

the optical wavefront modifier includes a deformable mirror which operates to produce local phase values at different locations by controlling the actuator elements to produce reflected light as the modified optical signal.

27. The system as in claim 22, wherein:

the optical wavefront modifier includes a spatial light modulator that produces the modified optical signal.

* * * * *